US012106555B2

(12) United States Patent
Guo (10) Patent No.: US 12,106,555 B2
(45) Date of Patent: Oct. 1, 2024

(54) METHOD AND DEVICE FOR RETRIEVING IMAGE

(71) Applicant: Beijing Jingdong Zhenshi Information Technology Co., Ltd., Beijing (CN)

(72) Inventor: Zhongqiang Guo, Beijing (CN)

(73) Assignee: Beijing Jingdong Zhenshi Information Technology Co., Ltd., Beijing (CN)

( * ) Notice: Subject to any disclaimer, the term of this patent is extended or adjusted under 35 U.S.C. 154(b) by 223 days.

(21) Appl. No.: 17/628,391

(22) PCT Filed: Mar. 19, 2020

(86) PCT No.: PCT/CN2020/080263
§ 371 (c)(1),
(2) Date: Jan. 19, 2022

(87) PCT Pub. No.: WO2021/012691
PCT Pub. Date: Jan. 28, 2021

(65) Prior Publication Data
US 2022/0292132 A1    Sep. 15, 2022

(30) Foreign Application Priority Data
Jul. 23, 2019   (CN) .......................... 201910665039.8

(51) Int. Cl.
G06F 16/535   (2019.01)
G06F 16/56    (2019.01)
(Continued)

(52) U.S. Cl.
CPC ............ *G06V 10/82* (2022.01); *G06F 16/535* (2019.01); *G06F 16/56* (2019.01); *G06F 16/583* (2019.01);
(Continued)

(58) Field of Classification Search
None
See application file for complete search history.

(56) References Cited

U.S. PATENT DOCUMENTS 5,983,237 A    11/1999 Jain et al.
9,449,026 B2   9/2016 Wang et al.
(Continued)

FOREIGN PATENT DOCUMENTS

CN    1378159 A    11/2002
CN    102339306 A   2/2012
(Continued)

OTHER PUBLICATIONS

International Search Report and Written Opinion for International Application No. PCT/CN2020/080263, dated Jun. 24, 2020, 5 pages.
(Continued)

*Primary Examiner* — Giuseppi Giuliani
(74) *Attorney, Agent, or Firm* — Buchanan Ingersoll & Rooney PC (57) ABSTRACT

A method for retrieving an image is provided. The method comprises: acquiring a first matrix obtained by performing feature extraction on a sketch of a target item; acquiring a second matrix composed of word vectors of keywords in a keyword set corresponding to the target item; acquiring a third matrix set obtained by performing feature extractions on images in an image set respectively; determining, for a third matrix in the third matrix set, a comprehensive matching degree between an item presented in an image corresponding to the third matrix and the target item, based on a first matching degree between the first matrix and the third matrix and a second matching degree between the second matrix and the third matrix; and selecting a preset number of images from the image set based on the determined com-
(Continued)

prehensive matching degrees, and sending the selected images.

10 Claims, 5 Drawing Sheets

(51) Int. Cl.
| | | |
|---|---|---|
| *G06F 16/58* | (2019.01) | |
| *G06F 16/583* | (2019.01) | |
| *G06F 16/732* | (2019.01) | |
| *G06V 10/40* | (2022.01) | |
| *G06V 10/74* | (2022.01) | |
| *G06V 10/77* | (2022.01) | |
| *G06V 10/82* | (2022.01) | |

(52) U.S. Cl.
CPC ...... *G06F 16/5866* (2019.01); *G06F 16/7335* (2019.01); *G06V 10/40* (2022.01); *G06V 10/761* (2022.01); *G06V 10/7715* (2022.01)

(56) References Cited

U.S. PATENT DOCUMENTS

| | | | |
|---|---|---|---|
| 2002/0168117 A1 | 11/2002 | Lee et al. | |
| 2011/0311129 A1* | 12/2011 | Milanfar | G06V 10/50 382/154 |
| 2012/0054177 A1 | 3/2012 | Wang et al. | |
| 2012/0072410 A1 | 3/2012 | Wang et al. | |
| 2015/0261846 A1* | 9/2015 | Hall | G06N 5/02 707/738 |
| 2018/0053293 A1 | 2/2018 | Ramalingam et al. | |
| 2020/0097604 A1* | 3/2020 | Lee | G06N 3/08 |

FOREIGN PATENT DOCUMENTS

| | | |
|---|---|---|
| CN | 104778242 A | 7/2015 |
| CN | 105718531 A | 6/2016 |
| CN | 106202189 A | 12/2016 |
| CN | 107895028 A | 4/2018 |
| CN | 108334627 A | 7/2018 |
| CN | 108595636 A | 9/2018 |
| CN | 109033308 A | 12/2018 |
| CN | 109145140 A | 1/2019 |
| CN | 109408655 A | 3/2019 |
| EP | 1258816 A2 | 11/2002 |
| JP | 2002366575 A | 12/2002 |
| JP | 2013246739 A | 12/2013 |
| JP | 2018055730 A | 4/2018 |
| JP | 2018116572 A | 7/2018 |
| JP | 2019045984 A | 3/2019 |

OTHER PUBLICATIONS

Wang et al., "Image Annotation and Retrieval Algorithm Based on Relevance Feedback", Journal of Computer Applications, 2009, vol. 29, No. 7, with partial translation, 4 pages.

Chen et al., "CSLBP Feature Quantity Based on Spatial Phase Segmentation," May 30, 2014, 10 pages with translation.

* cited by examiner

METHOD AND DEVICE FOR RETRIEVING IMAGE

CROSS-REFERENCE TO RELATED APPLICATIONS

The present application is a national stage of International Application No. PCT/CN2020/080263, filed on Mar. 19, 2020, which claims the priority of Chinese Patent Application No. 201910665039.8, titled "METHOD AND DEVICE FOR IMAGE RETRIEVAL", filed on Jul. 23, 2019, the contents of each of which are incorporated herein by reference in their entireties.

TECHNICAL FIELD

Embodiments of the present disclosure relate to a field of computer technology, and in particular to a method and apparatus for retrieving an image.

BACKGROUND

At present, image retrieval usually includes text-based image retrieval and content-based image retrieval. Text-based image retrieval is generally performed by using a text description to describe features of an image, and matching the text description with a text description corresponding to each image in an image library, so as to determine a retrieval result. Content-based image retrieval is generally performed, based on features such as color, texture, or layout of an image, by matching these features with features such as color, texture, or layout corresponding to each image in an image library to determine a retrieval result.

Because the text description of an image is usually subjective, an accuracy of the retrieval result may be affected. Since only an original image is relatively rich in color, texture and other features, in some existing content-based image retrieval methods, a user is generally required to provide the original image of a to-be-retrieved item. In addition, the features such as color and texture extracted from an image are generally objective description information of the image, and it is difficult to express semantic information of the image.

SUMMARY

Embodiments of the present disclosure propose a method and apparatus for retrieving an image.

In a first aspect, a method for retrieving an image is provided by some embodiments of the present disclosure, the method including: acquiring a first matrix obtained by performing feature extraction on a sketch of a target item; acquiring a second matrix composed of word vectors of keywords in a keyword set corresponding to the target item, wherein the keywords in the keyword set are used to describe the target item; acquiring a third matrix set obtained by performing feature extractions on images in an image set respectively; determining, for a third matrix in the third matrix set, a matching degree between an item presented in an image corresponding to the third matrix and the target item, based on a matching degree between the first matrix and the third matrix and a matching degree between the second matrix and the third matrix; and selecting a preset number of images from the image set based on the determined matching degrees, and sending the selected images.

In a second aspect, an apparatus for retrieving an image is provided by some embodiments of the present disclosure, the apparatus including: an acquisition unit, configured to acquire a first matrix obtained by performing feature extraction on a sketch of a target item; the acquisition unit, further configured to acquire a second matrix composed of word vectors of keywords in a keyword set corresponding to the target item, wherein the keywords in the keyword set are used to describe the target item; the acquisition unit, further configured to acquire a third matrix set obtained by performing feature extractions on images in an image set respectively; a determination unit, configured to determine, for a third matrix in the third matrix set, a matching degree between an item presented in an image corresponding to the third matrix and the target item, based on a matching degree between the first matrix and the third matrix, and a matching degree between the second matrix and the third matrix; and a sending unit, configured to select a preset number of images from the image set based on the determined matching degrees, and send the selected images.

In a third aspect, some embodiments of the present disclosure provide a computer-readable medium storing a computer program thereon, where the program, when executed by a processor, implements the method as described in any one of the embodiments of the first aspect.

BRIEF DESCRIPTION OF THE DRAWINGS

By reading the detailed description of non-limiting embodiments with reference to the following accompanying drawings, other features, objects and advantages of the present disclosure will become more apparent.

DETAILED DESCRIPTION OF EMBODIMENTS

Embodiments of the present disclosure will be further described below in detail in combination with the accompanying drawings. It should be appreciated that detailed embodiments described herein are merely used for explaining the relevant invention, rather than limiting the invention. In addition, it should be noted that, for the ease of description, only the parts related to the relevant invention are shown in the accompanying drawings.

It should be noted that embodiments in the present disclosure and the features in embodiments may be combined with each other on a non-conflict basis. Embodiments of the present disclosure will be described below in detail with reference to the accompanying drawings.

Figure 1:
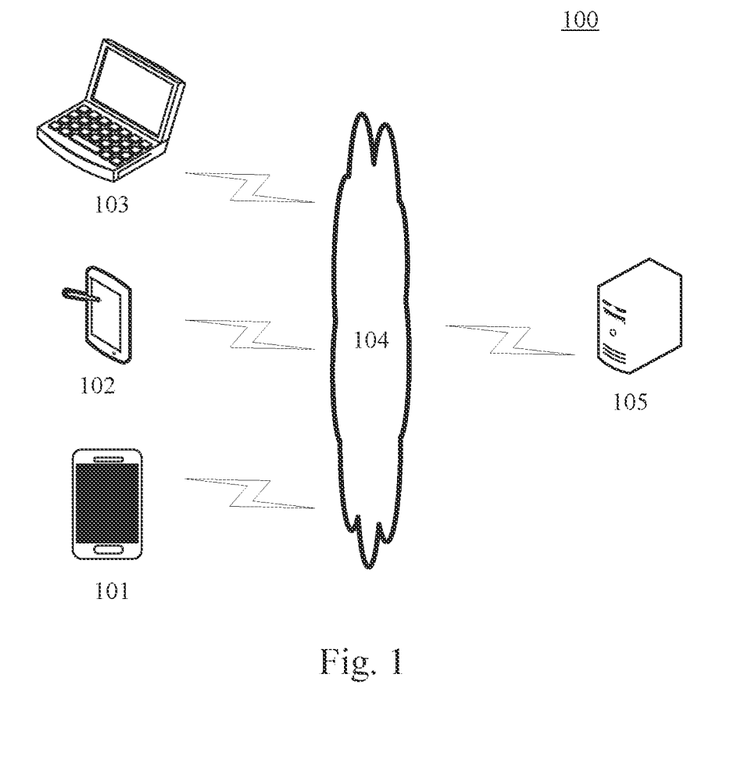
FIG. 1 is an exemplary system architecture diagram to which an embodiment of the present disclosure may be applied.

FIG. 1 shows an exemplary architecture 100 to which an embodiment of a method for retrieving an image or an apparatus for retrieving an image of the present disclosure may be applied.

As shown in FIG. 1, the system architecture 100 may include terminal devices 101, 102, 103, a network 104 and a server 105. The network 104 serves as a medium for providing a communication link between the terminal devices 101, 102, 103 and the server 105. The network 104 may include various types of connections, such as wired or wireless communication links, or optical fiber cables.

The terminal devices 101, 102, 103 interact with the server 105 through the network 104 to receive or send messages. Various client applications, such as browser applications, search applications, image processing applications, may be installed on the terminal devices 101, 102, 103.

The terminal devices 101, 102, and 103 may be hardware or software. When the terminal devices 101, 102, 103 are hardware, they may be various electronic devices, including but not limited to smart phones, tablet computers, E-book readers, laptop computers, desktop computers, and so on. When the terminal devices 101, 102, 103 are software, they may be installed in the electronic devices listed above. They may be implemented as a plurality of software or software modules (for example, a plurality of software or software modules used to provide distributed services), or as a single software or software module, which is not limited herein.

The server 105 may be a server that provides various services, for example, a back-end server that provides back-end support for client applications installed on the terminal devices 101, 102, and 103. The server 105 may receive a sketch and a keyword set of a target item sent by the terminal devices 101, 102, 103, process the sketch and the keyword set of the target item respectively, then, based on processing results, select, from an image set, an image that matches the sketch and the keyword set of the target item, and send the selected image to the terminal devices 101, 102, 103.

It should be noted that the sketch and the keyword set of the target item may also be directly stored on the server 105 locally, and the server 105 may directly extract and process the sketch and the keyword set of the target item stored locally. In this regard, the terminal devices 101, 102, 103 and the network 104 may be omitted.

It should be noted that the method for retrieving an image provided by the embodiments of the present disclosure is generally performed by the server 105. Correspondingly, the apparatus for retrieving an image is generally provided in the server 105.

It should also be stated that the terminal devices 101, 102, 103 may also be installed with image processing applications, and the terminal devices 101, 102, 103 may also process face images based on the image processing applications. In this regard, the method for retrieving an image may also be performed by the terminal devices 101, 102, 103. Correspondingly, the apparatus for retrieving an image may also be provided in the terminal devices 101, 102, 103. In this regard, the exemplary system architecture 100 may not include the server 105 and the network 104.

It should be noted that the server 105 may be hardware or software. When the server is hardware, it may be implemented as a distributed server cluster composed of a plurality of servers, or as a single server. When the server 105 is software, it may be implemented as a plurality of software or software modules (for example, a plurality of software or software modules used to provide distributed services), or as a single software or software module, which is not limited herein.

It should be appreciated that the number of the terminal devices, the network and the server in FIG. 1 is merely illustrative. Any number of terminal devices, networks and servers may be provided according to actual requirements.

Figure 2:
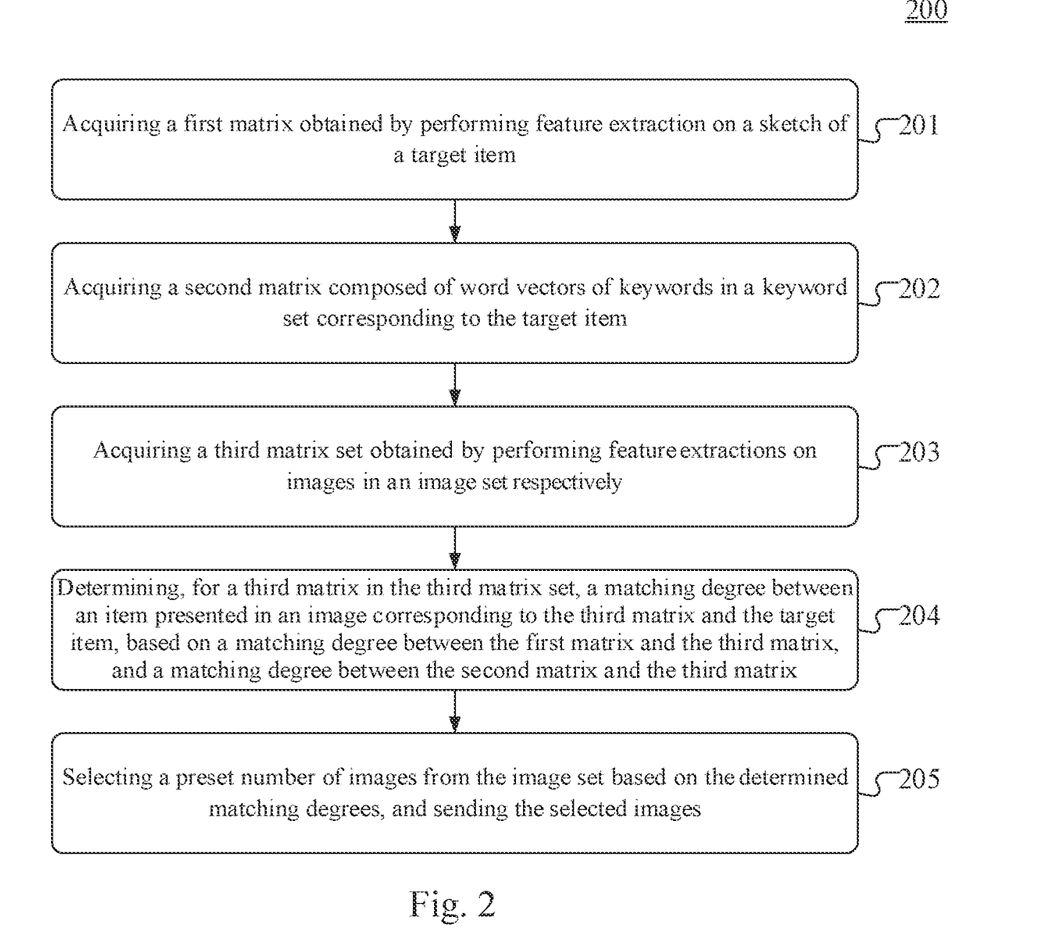
FIG. 2 is a flowchart of an embodiment of a method for retrieving an image according to the present disclosure.

With further reference to FIG. 2, FIG. 2 illustrates a flow 200 of an embodiment of a method for retrieving an image according to the present disclosure. The method for retrieving an image includes the following steps.

Step 201, acquiring a first matrix obtained by performing feature extraction on a sketch of a target item.

In the present embodiment, the target item may be a retrieval target of a user, that is, an item that the user expects to be present in a retrieved image. The sketch of the target item may be used as an initial representation for representing a design or physical concept of the item. For example, a structure and size of the item, as well as a relative positional relationship of various parts of the item may be presented in the sketch of the target item.

In the present embodiment, the user may draw the sketch of the target item, or the user may select the sketch of the target item from some existing sketch libraries (such as the Sketchy image library).

In the present embodiment, performing feature extraction on the sketch may refer to the extraction of some image information of the sketch. Generally, the sketch may be analyzed and processed to determine whether pixels of the sketch may represent a certain feature of the sketch. Specifically, various existing image feature extraction methods may be used to perform feature extraction on the sketch.

For example, a feature extraction method based on SURF (Scale Invariant Feature Transform) may be used to extract features of the sketch of the target item. As another example, a feature extraction method based on deep learning may be used to extract features of the sketch of the target item.

Optionally, a feature extraction result for the sketch may be a feature vector. In this regard, the feature vector obtained by the extraction may be regarded as the first matrix.

In some optional implementations of the present embodiment, the sketch may first be spit into at least two sub-images. Then, a pre-trained convolutional neural network may be used to perform feature extractions on the at least two sub-images respectively, and feature vectors corresponding to the at least two sub-images respectively may be obtained. Thereby, a matrix composed of the feature vectors corresponding to the at least two sub-images may be determined as the first matrix.

A method for splitting the sketch may be selected flexibly. For example, a geometric center of the sketch may be used as a center point, and the sketch is split into four sub-images evenly according to both horizontal and vertical directions.

A method for obtaining the matrix composed of the feature vectors corresponding to the at least two sub-images may be pre-set by those skilled in the art. For example, the first matrix is obtained by arranging the feature vectors in rows sequentially in a specified order.

By splitting the sketch, a subsequent matching process may be targeted to perform the matching for an image area of a corresponding location. That is to say, in the matching process, more accurate location information is used, which facilitates to increase an accuracy of a matching result, and thus increase an accuracy of a retrieval result.

When performing feature extraction on the sketch of the target item using the convolutional neural network, the convolutional neural network may be a neural network (such as a deep learning model) of various types and pre-trained for extracting image features.

Generally, the convolutional neural network may be composed of several convolutional layers, pooling layers, and fully connected layers. The convolutional layer is used to perform a convolution operation on an image input to the convolutional layer to extract features. The pooling layer is used to compress an output result of the convolutional layer to extract key features. The fully connected layer may integrate extracted local features of the image to map distributed feature representations learned by layers before the fully connected layer to a sample label space.

Optionally, the convolutional neural network for extracting image features may be obtained by training through the following steps.

Step one, acquiring a sketch set, and acquiring a matching image set corresponding to each sketch in the sketch set.

In this step, various image processing methods may be used to generate a large number of sketches to construct the sketch set, or the sketch set may be acquired from a third-party data platform. Matching images in a matching image set and a sketch corresponding to this sketch set may be used to present the same item. For any one of the sketches, the matching images in the matching image set corresponding to the sketch may be designated by those skilled in the art, or may be acquired from a third-party data platform.

Step two, selecting a sketch from the sketch set, and performing the following training step one to training step three.

In this step, the method for selecting the sketches from the sketch set may be flexibly set according to different application scenarios. For example, a preset number of sketches may be randomly selected from the sketch set. As another example, a preset number of sketches that have not been selected may be selected from the sketch set.

Training step one, performing feature extractions on the selected sketch and images in a target image set respectively to obtain the output matrices respectively corresponding to the sketches and the images in the target image set using an initial model.

The initial model may be various types of untrained or training-uncompleted artificial neural networks, for example, a deep learning model. The initial model may also be a model obtained by combining a variety of untrained or training-uncompleted artificial neural networks. Specifically, those skilled in the art may construct the initial model according to actual application requirements (such as the number of convolutional layers, and a size of a convolution kernel).

The target image set may be preset by those skilled in the art. Optionally, the target image set may be the above image set.

Training step two, determining a matching degree between the obtained output matrix corresponding to the selected sketch and the output matrix corresponding to each image in the target image set, and selecting an image having a corresponding matching degree greater than a preset threshold.

In a method for calculating the matching degree of the two output matrices, various existing matrix matching algorithms may be applied. For example, the two matrices may be flattened into vectors in a preset method, and then a similarity between the two obtained vectors may be calculated as the matching degree of the two output matrices.

The preset threshold may be set in advance by those skilled in the art according to actual application requirements.

Training step three, determining a recall ratio and/or precision ratio corresponding to selected images based on the selected images and a matching image set corresponding to an input sketch, and determining whether training of the initial model is completed based on the determined recall ratio and/or precision ratio.

The recall ratio may be used to represent a retrieval extent of desired images. Generally, the recall ratio may be represented by a ratio of the number of images included in an intersection of the selected images and the matching image set to a total number of images that are included in the target image set and present the same item as the input sketch.

The precision ratio may be used to represent a percentage of desired images as retrieved to all retrieved images. Generally, the precision ratio may be represented by a ratio of the number of images included in the intersection of the selected images and the matching image set to a total number of images included in the matching image set.

Optionally, after the recall ratio and/or precision ratio are determined, a value of a preset loss function may be determined, and based on the determined value of the loss function, it is determined whether the training of the initial model is completed. A calculation method for the loss function may be set in advance by those skilled in the art. For example, the preset loss function may be used to represent a degree of difference between the determined recall ratio and/or precision ratio and a preset recall ratio and/or precision ratio. In this regard, it may be determined whether the training of the initial model is completed based on whether the determined value of the loss function is less than a preset loss threshold.

If it is determined that the training of the initial model is completed based on the determined recall ratio and/or precision ratio, the trained initial model may be determined as the convolutional neural network for extracting image features.

If it is determined that the training of the initial model is not completed based on the determined recall ratio and/or precision ratio, a parameter of the initial model may be adjusted based on the determined recall ratio and/or precision ratio, and an adjusted initial model may be determined as the initial model, a sketch is re-selected from the sketch set, to continue performing the above training step one to training step three.

Specifically, a gradient descent and back propagation algorithm may be used to adjust parameters of the layers of the initial model based on the value of the loss function, so that the recall ratio and/or precision ratio of the adjusted initial model may be as high as possible.

In the present embodiment, the first matrix may be obtained by performing feature extraction on the sketch of the target item in advance by other electronic devices. In this regard, an executing body of the method for retrieving an image (such as the server 105 shown in FIG. 1) may acquire the first matrix from other electronic devices. It may be understood that the first matrix may also be obtained by performing feature extraction on the sketch of the target item by the above executing body in advance. In this regard, the above executing body may directly acquire the first matrix locally.

Step 202, acquiring a second matrix composed of word vectors of keywords in a keyword set corresponding to the target item.

In the present embodiment, the keywords in the keyword set may be used to describe the target item. The keywords in the keyword set may be set by the user in advance. The word vectors of the keywords in the keyword set may be determined by using various existing methods for generating a word vector (such as Word2Vec and FastText).

A method for composing the second matrix by word vectors of the keywords in the keyword set may be set by those skilled in the art in advance. For example, the second matrix may be obtained by sequentially arranging the word vectors corresponding to keywords in rows according to a preset order respectively.

In the present embodiment, the word vectors of the keywords in the keyword set may be generated in advance by other electronic devices, to obtain the second matrix. In this regard, the executing body may acquire the second matrix from other electronic devices. It may be understood that the executing body may also generate the word vectors of the keywords in the keyword set in advance, to obtain the second matrix. In this regard, the executing body may directly acquire the second matrix locally.

Optionally, after the word vectors of the keywords are generated in advance, a correspondence between the keywords and the word vectors may be stored, so that when a word vector corresponding to a keyword may be directly obtained to be used subsequently, facilitating to improve an image retrieval speed. In this regard, if the word vectors are obtained using a neural network (such as the Word2Vec), then the neural network may be retrained using new keywords and corresponding word vectors after a certain time interval to update the neural network.

Step 203, acquiring a third matrix set obtained by performing feature extractions on images in an image set respectively.

In the present embodiment, various existing image feature extraction methods may be used to perform feature extractions on the images in the image set respectively. For example, the feature extraction method based on SURF (Scale Invariant Feature Transform) may be used to extract features of the images in the image set. As another example, the feature extraction method based on deep learning may be used to extract features of the images in the image set.

Optionally, the same convolutional neural network may be used to perform feature extractions on the sketch of the target item and each image in the image set respectively, to obtain the first matrix corresponding to the sketch of the target item and a third matrix corresponding to each image in the image set.

Optionally, the images included in the image set are generally massive, and an update frequency of the image set is usually low. Therefore, it is possible to perform feature extraction on each image in the image set in advance to obtain the third matrix corresponding to each image, and then store a correspondence between each image and the corresponding third matrix. As such, the third matrix corresponding to each image may be used directly subsequently, and there is no need to process each image again to obtain the third matrix corresponding to this image, facilitating to improve the image retrieval speed. If the image set is updated, a correspondence between an updated part and the corresponding third matrices may be further stored. In this regard, if the third matrix is obtained by using the convolutional neural network, and the image set is updated, the updated part may also be used to further train the convolutional neural network, so as to update the convolutional neural network.

Step 204, determining, for a third matrix in the third matrix set, a matching degree between an item presented in an image corresponding to the third matrix and the target item, based on a matching degree between the first matrix and the third matrix, and a matching degree between the second matrix and the third matrix.

In the present embodiment, various existing matrix matching algorithms may be used to calculate the matching degree between the first matrix and the third matrix, and the matching degree between the second matrix and the third matrix. Furthermore, based on the obtained two matching degrees, the matching degree between the item presented in the image corresponding to the third matrix and the target item may be determined comprehensively. Specifically, the method for comprehensively determining the matching degree between the item presented in the image corresponding to the third matrix and the target item based on the obtained two matching degrees may be flexibly set.

Optionally, a maximum or an average of the two matching degrees may be determined as the matching degree between the item presented in the image corresponding to the third matrix and the target item.

Optionally, a first preset weight of the first matrix may be acquired, and a second preset weight of the second matrix may be acquired. Then, based on the acquired first preset weight and second preset weight, the matching degree between the item presented in the image corresponding to the third matrix and the target item is determined according to a weighted sum of the matching degree between the first matrix and the third matrix and the matching degree between the second matrix and the third matrix.

The first preset weight and the second preset weight may be set in advance by those skilled in the art, or the user may input the first preset weight and the second preset weight. Optionally, a value range of the first preset weight and the second weight may be [0-1], and a sum of the first preset weight and the second preset weight is equal to 1.

Optionally, the weighted sum of the matching degree between the first matrix and the third matrix and the matching degree between the second matrix and the third matrix may be determined as the matching degree between the item presented in the image corresponding to the third matrix and the target item. It is also possible to determine, after the weighted sum is determined, a value of a preset function corresponding to the weighted sum as the matching degree between the item presented in the image corresponding to the third matrix and the target item. The preset function may be set in advance by those skilled in the art.

It may be understood that, in some cases, if the user sets the first preset weight to 0 or the second preset weight to 0, image retrieval only based on the sketch of the target item or the keywords in the keyword set of the target item may be achieved. That is, the user may flexibly set different retrieval manners according to actual needs to control an influence of the sketch of the target item and the keywords in the keyword set of the target item on the retrieval result, facilitating to improve the accuracy of the retrieval result.

Step 205, selecting a preset number of images from the image set based on the determined matching degrees, and sending the selected images.

In the present embodiment, the preset number may be set in advance by those skilled in the art. After obtaining the corresponding matching degree of each image in the image set, a method for selecting an image from the image set may be flexibly set.

For example, the preset number of images may be selected from the image set according to a descending order of the corresponding matching degrees. As another example, an image subset may be selected from the image set based on a preset matching degree threshold, and then the preset number of images may be randomly selected from the image subset.

In the present embodiment, the images selected from the image set may be sent to other electronic devices. For example, they may be sent to a user terminal connected to the executing body (the terminal devices 101, 102, 103 as shown in FIG. 1).

Optionally, a correspondence between the sketch of the target item and the images selected from the image set may also be stored. Therefore, if the sketch of the target item is acquired again, the images in the image set that are matched with the sketch of the target item may be quickly acquired according to the stored correspondence.

Figure 3:
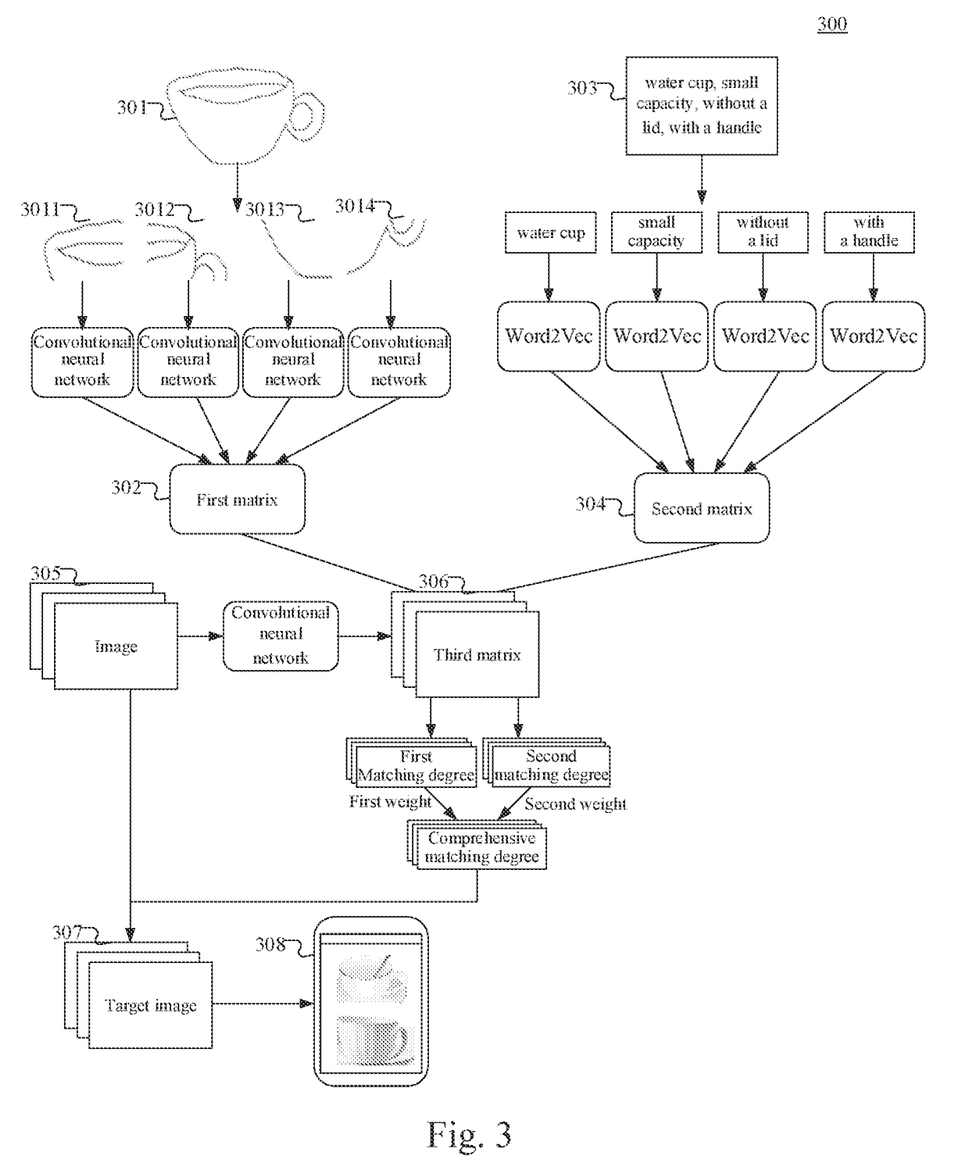
FIG. 3 is a schematic diagram of an application scenario of the method for retrieving an image according to an embodiment of the present disclosure.

With further reference to FIG. 3, FIG. 3 is a schematic diagram 300 of an application scenario of the method for retrieving an image according to the present embodiment. In the application scenario of FIG. 3, the executing body may acquire, in advance, a sketch 301 input by a user through a terminal device 308 used by the user, and then using the geometric center of the sketch 301 as the center point, split the sketch 301 into a sub-image 3011, a sub-image 3012, a sub-image 3013, and a sub-image 3014 according to both horizontal and vertical directions. After that, the obtained four sub-images may be respectively input to a pre-trained convolutional neural network to obtain feature vectors corresponding to the four sub-images respectively, and a first matrix 302 is formed by the feature vectors corresponding to the four sub-images.

The executing body may acquire, in advance, a keyword set 303 input by the user through the terminal device 308. The keyword set 303 includes four keywords: "water cup", "small capacity", "without lid" and "with handle". After that, a pre-trained Word2Vec model may be used to generate word vectors corresponding to the four keywords respectively, and then a second matrix 304 composed of the word vectors corresponding to the four keywords may be obtained.

The executing body may process images in an image set 305 in advance to obtain a third matrix corresponding to each image, and obtain a third matrix set 306. A processing procedure for the images in the image set 305 is similar to the processing procedure for the sketch 301 described above. Description is made by using an image in the image set 305 as an example. By using the geometric center of the image as the center point, the image is split into four sub-images according to the horizontal and vertical directions. After that, the obtained four sub-images may be respectively input to a pre-trained convolutional neural network to obtain feature vectors corresponding to the four sub-images respectively, and the feature vectors corresponding to the four sub-images respectively form the third matrix corresponding to the image.

Then, a comprehensive matching degree corresponding to each third matrix in the third matrix set 306 may be determined. Description is made by using a third matrix in the third matrix set 306 as an example. A matching degree between the third matrix and the first matrix 302 may be determined as a first matching degree, and at the same time a matching degree between the third matrix and the second matrix 304 may be determined as a second matching degree. Then, based on a preset first weight and second weight, a weighted sum of the first matching degree and the second matching degree is determined as the comprehensive matching degree corresponding to the third matrix.

After that, a preset number of images may be selected from the image set 305 as target images according to a descending order of the corresponding matching degree to obtain a target image set 307, and the target image set 307 may be pushed to the terminal device 308 used by the user for display.

By the method for retrieving an image provided by the above embodiments of the present disclosure, retrieval based on a sketch and keywords of an item is achieved, thereby avoiding failing to perform retrieval or low accuracy of retrieval results when the user cannot provide an original image of the item. At the same time, by combining features such as the size and structure of the item provided by the sketch, as well as semantic features of the item provided by the keywords, the accuracy of the retrieval result is ensured.

Figure 4:
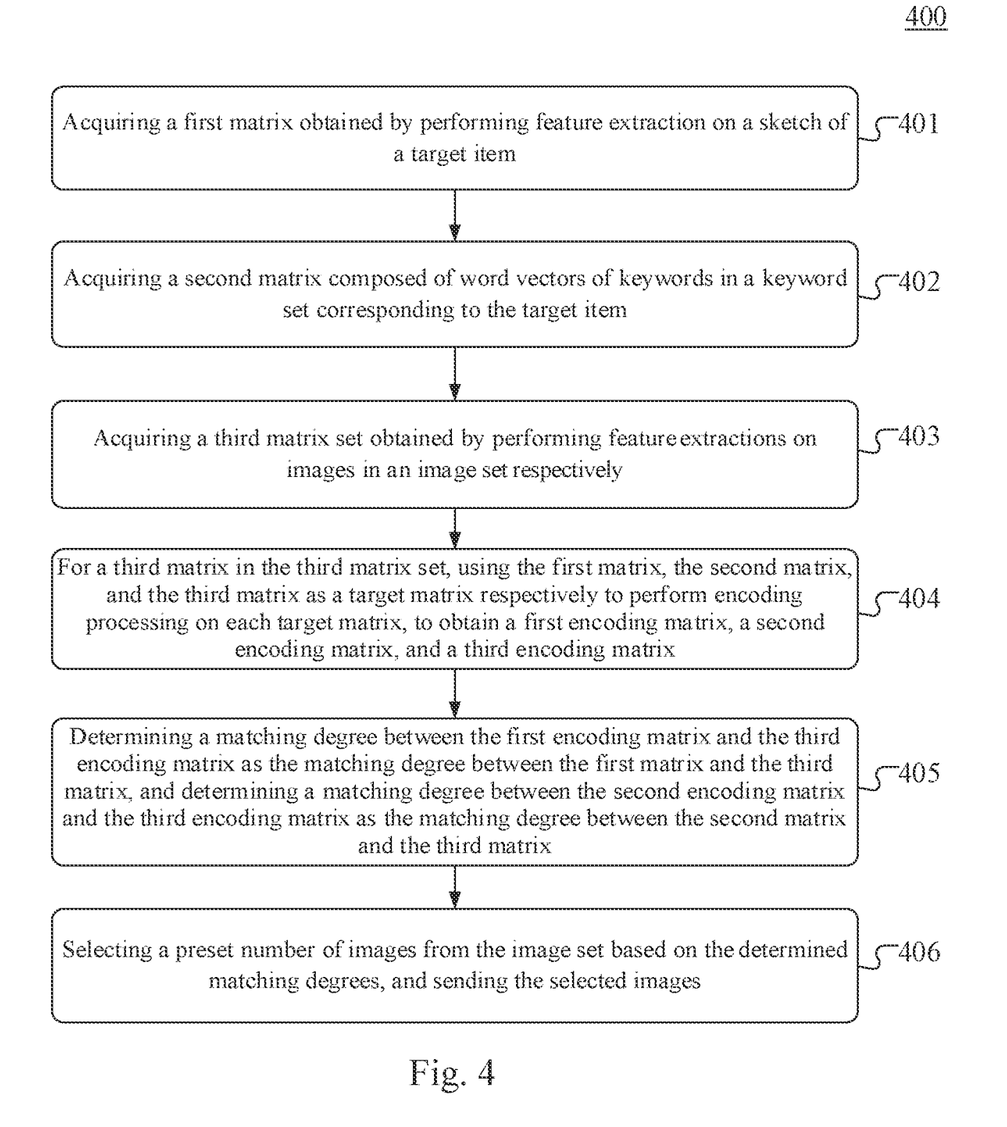
FIG. 4 is a flowchart of another embodiment of the method for retrieving an image according to the present disclosure.

With further reference to FIG. 4, FIG. 4 illustrates a flow 400 of another embodiment of the method for retrieving an image. The flow 400 of the method for retrieving an image includes the following steps.

Step 401, acquiring a first matrix obtained by performing feature extraction on a sketch of a target item.

Step 402, acquiring a second matrix composed of word vectors of keywords in a keyword set corresponding to the target item.

Step 403, acquiring a third matrix set obtained by performing feature extractions on images in an image set respectively.

For the execution process of the steps 401, 402, and 403, reference may be made to related descriptions of steps 201, 202, and 203 in the embodiment corresponding to FIG. 2, and detailed description thereof will be omitted.

Step 404, for a third matrix in the third matrix set, by using the first matrix, the second matrix, and the third matrix as a target matrix respectively, to perform encoding processing on each target matrix to obtain a first encoding matrix, a second encoding matrix, and a third encoding matrix.

In the present embodiment, the encoding processing may be used to map the target matrix into a binary encoding matrix. The binary encoding matrix may refer to a matrix having elements with values of "0" or "1".

Optionally, the encoding processing may include: first converting the target matrix into a matrix of a preset dimension, and then performing normalization processing on elements in the matrix, so that a value range of each element included in the matrix is [0-1]. After that, an encoding value of an element with a value greater than a preset standard value may be set to "1", and an encoding value of an element with a value not greater than the preset standard value may be set to "0". Both the preset dimension and the preset standard value may be set in advance by those skilled in the art.

Some existing data processing applications may be used to convert the target matrix into a matrix of the preset dimension. It is also possible to convert the target matrix into the matrix of the preset dimension by, based on the preset dimension, setting a pooling window and performing a pooling operation (such as average pooling) on the target matrices.

By performing encoding processing on the first matrix, the second matrix, and the third matrix, the dimensions of the generated first encoding matrix, the second encoding matrix, and the third encoding matrix may be controlled correspondingly, such that the first encoding matrix, the second encoding matrix, and the third encoding matrix are binary encoding matrices. Therefore, difficulties in subsequent matrix matching may be reduced, and a speed of matrix matching may be greatly improved.

Optionally, the encoding processing may include:

(1) for a row vector S in row vectors of a target matrix, the following steps may be performed:

Step one, splitting elements included in S into C groups. C may represent the number of columns of the encoding matrix.

In this step, C may be set in advance by those skilled in the art. The number of elements contained in each group obtained by splitting may also be set in advance by those skilled in the art.

Optionally, a quotient of the number of the elements included in S and C may be first determined, and then the number of elements included in each group in the C groups may be determined based on the determined quotient.

For example, it is possible to provide as many groups as possible with the number of elements equal to a result obtained by rounding up or rounding down the determined quotient.

Step two, determining, for a group in the C groups, a statistical feature of values of elements included in the group.

In this step, the statistical feature includes but is not limited to one of sum, expectation, variance, maximum, and standard deviation. A specific type of the statistical feature may be selected by those skilled in the art according to different application scenarios.

Step three, determining, in response to determining that the obtained statistical feature is greater than a target threshold T, that an encoding value of the group is 1; and determining, in response to determining that the obtained statistical feature is less than T, that the encoding value of the group is 0.

In this step, the target threshold T may be set in advance by those skilled in the art.

Optionally, $$T = \lceil D/C \rceil \times \sum_{i=1}^{i=D} S_i.$$

Here, D represents the number of the elements that may be include in S, and $S_i$ may represent a value of the $i^{th}$ element in S.

(2) forming a row of the encoding matrix by the encoding values corresponding to the groups in the C groups respectively, to obtain the encoding matrix.

According to different application scenarios, by controlling the number of elements included in each group split by each row vector, and using the corresponding statistical feature of each group as the statistical feature to achieve encoding processing, it is advantageous to retain more original information, thereby improving the accuracy of subsequent matrix matching and image retrieval.

Optionally, the encoding processing may include:

First, performing following update processing respectively for each row vector of the target matrix, to obtain an updated target matrix: normalizing the row vector, and determining a corresponding update value of each element contained in the row vector based on normalization results of the row vector. The corresponding update value of each element contained in the row vector is positively correlated with the normalization result corresponding to each element.

The normalization may specifically include: first determining a sum of values of the elements included in the row vector, and then determining a quotient of each element contained in the row vector and the determined sum as the normalization result corresponding to each element.

Optionally, the normalization result corresponding to each element may be directly used as the update value corresponding to each element.

Optionally, the corresponding update value of each element contained in the row vector may be determined based on the normalization results of the row vector and a preset adjustment parameter λ. The corresponding update value of each element contained in the row vector may be positively correlated with λ.

For example, for an element in elements contained in the row vector, a product of the normalization result corresponding to the element and λ may be determined as the update value corresponding to the element. As another example, for an element in the elements contained in the row vector, a square root of the product of the normalization result corresponding to the element and λ may be determined as the update value corresponding to the element.

Secondly, performing following steps for a row vector S in row vectors of the updated target matrix: splitting elements included in S into C groups, where C represents the number of columns of the encoding matrix; determining, for a group in the C groups, a statistical feature of values of elements included in the group; determining, in response to determining that the determined statistical feature is greater than a target threshold T, that an encoding value of the group is 1; and determining, in response to determining that the determined statistical feature is less than T, that the encoding value of the group is 0.

Thirdly, forming a row of the encoding matrix by the encoding values corresponding to the groups in the C groups respectively, to obtain the encoding matrix.

For the execution process of the second and third steps above, reference may be made to the related descriptions of the above steps (2) and (3), and detailed description thereof will be omitted.

By first normalizing the row vectors of the first matrix, the second matrix, and the third matrix to update the first matrix, the second matrix, and the third matrix, noises of the first matrix, the second matrix, and the third matrix may be reduced, and the universality and stability of the first matrix, the second matrix, and the third matrix may be improved, thereby ensuring the accuracy of subsequent matrix matching.

Step 405, determining a matching degree between the first encoding matrix and the third encoding matrix as the matching degree between the first matrix and the third matrix, and determining a matching degree between the second encoding matrix and the third encoding matrix as the matching degree between the second matrix and the third matrix.

Step 406, selecting a preset number of images from the image set based on the determined matching degrees, and sending the selected images.

For the execution process of this step, reference may be made to the related description of step 205 in the embodiment corresponding to FIG. 2, and detailed description thereof will be omitted.

It should be noted that a specific manner for composing the target matrices (including the first matrix, the second matrix, and the third matrices in the third matrix set) in the present disclosure may be flexibly set. For example, when the target matrix is a vector, it may be a row vector or a column vector. When the target matrix is composed of several vectors, the vectors may be formed into the target matrix by rows, or the vectors may be formed into the target matrix by columns. For a matrix, a row of the matrix is a column of a transposed matrix for the matrix. Therefore, the "row" in the present disclosure may also be replaced with a "column", and the corresponding "column" may also be replaced with a "row".

It can be seen from FIG. 4 that, compared with the embodiment corresponding to FIG. 2, the flow 400 of the method for retrieving an image in the present embodiment highlights that in the matrix matching process, encoding processing may be performed on the matrix to control the dimension and calculation amount of the matrix used for matching calculation, so that the difficulty and calculation amount of the matrix matching process may be reduced, the matching speed may be increased, and the image retrieval speed may be improved.

Figure 5:
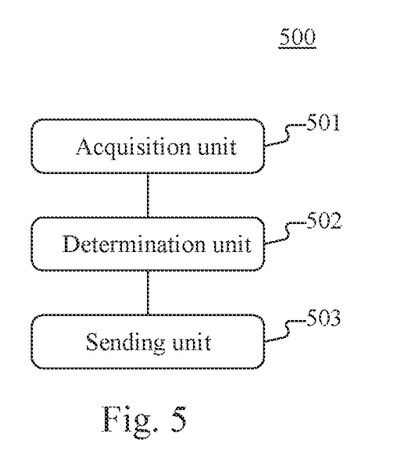
FIG. 5 is a schematic structural diagram of an embodiment of an apparatus for retrieving an image according to the present disclosure.

With further reference to FIG. 5, as an implementation of the method shown in the above figures, the present disclosure provides an embodiment of an apparatus for retrieving an image. The apparatus embodiment corresponds to the method embodiment as shown in FIG. 2. The apparatus may be applied to various electronic devices.

As shown in FIG. 5, an apparatus 500 for retrieving an image provided by the present embodiment includes: an acquisition unit 501, a determination unit 502 and a sending unit 503. The acquisition unit 501 is configured to acquire a first matrix obtained by performing feature extraction on a sketch of a target item. The acquisition unit 501 is further configured to acquire a second matrix composed of word vectors of keywords in a keyword set corresponding to the target item, where the keywords in the keyword set are used to describe the target item. The acquisition unit 501 is further configured to acquire a third matrix set obtained by performing feature extractions on images in an image set respectively. The determination unit 502 is configured to determine, for a third matrix in the third matrix set, a matching degree between an item presented in an image corresponding to the third matrix and the target item, based on a matching degree between the first matrix and the third matrix, and a matching degree between the second matrix and the third matrix. The sending unit 503 is configured to select a preset number of images from the image set based on the determined matching degrees, and send the selected images.

In the present embodiment, in the apparatus 500 for retrieving an image: for the specific processing and the technical effects of the acquisition unit 501, the determination unit 502 and the sending unit 503, and the storage unit 404, reference may be made to the relevant descriptions of step 201, step 202, step 203, step 204 and step 205 in the embodiment corresponding to FIG. 2 respectively, and detailed description thereof will be omitted.

In some optional implementations of the present embodiment, the determination unit 502 is further configured to: acquire a first preset weight of the first matrix, and acquire a second preset weight of the second matrix; and determine, based on the acquired first preset weight and the second preset weight, the matching degree between the item presented in the image corresponding to the third matrix and the target item according to a weighted sum of the matching degree between the first matrix and the third matrix and the matching degree between the second matrix and the third matrix.

In some optional implementations of the present embodiment, the matching degree between the first matrix and the third matrix, and the matching degree between the second matrix and the third matrix are determined through steps as follows: using the first matrix, the second matrix, and the third matrix as a target matrix respectively to perform encoding processing on each target matrix, so as to obtain a first encoding matrix, a second encoding matrix, and a third encoding matrix, wherein the encoding processing is used to map the target matrix into a binary encoding matrix; and determining a matching degree between the first encoding matrix and the third encoding matrix as the matching degree between the first matrix and the third matrix, and determining a matching degree between the second encoding matrix and the third encoding matrix as the matching degree between the second matrix and the third matrix.

In some optional implementations of the present embodiment, the encoding processing includes: for a row vector S in row vectors of the target matrix, performing following steps: splitting elements included in S into C groups, wherein C represents the number of columns of the encoding matrix; determining, for a group in the C groups, a statistical feature of values of elements included in the group; determining, in response to determining that the obtained statistical feature is greater than a target threshold T, that an encoding value of the group is 1; and determining, in response to determining that the obtained statistical feature is less than T, that the encoding value of the group is 0; and forming a row of the encoding matrix by the encoding values corresponding to the groups in the C groups respectively, to obtain the encoding matrix.

In some optional implementations of the present embodiment, the splitting elements included in S into C groups, includes: determining a quotient of the number of the elements included in S and C, and determining the number of elements included in each group of the C groups based on the determined quotient.

In some optional implementations of the present embodiment, $$T = \lceil D/C \rceil \times \sum_{i=1}^{i=D} S_i,$$

where D represents the number of the elements included in S, and $S_i$ represents a value of the $i^{th}$ element in S.

In some optional implementations of the present embodiment, the encoding processing includes: performing following update processing respectively for each row vector of the target matrix, to obtain an updated target matrix: normalizing the row vector, and determining a corresponding update value of each element contained in the row vector based on normalization results of the row vector, wherein the corresponding update value of each element contained in the row vector is positively correlated with the normalization result corresponding to the element; and performing following steps for a row vector S in row vectors of the updated target matrix: splitting elements included in S into C groups, wherein C represents the number of columns of the encoding matrix; determining, for a group in the C groups, a statistical feature of values of elements included in the group; determining, in response to determining that the obtained statistical feature is greater than a target threshold T, that an encoding value of the group is 1; and determining, in response to determining that the obtained statistical feature is less than T, that the encoding value of the group is 0; and forming a row of the encoding matrix by the encoding values corresponding to the groups in the C groups respectively, to obtain the encoding matrix.

In some optional implementations of the present embodiment, determining the corresponding update value of each element contained in the row vector based on normalization results of the row vector, includes: determining the corresponding update value of each element contained in the row vector, based on the normalization results of the row vector and a preset adjustment parameter λ, wherein the corresponding update value of each element contained in the row vector is positively correlated with λ.

In some optional implementations of the present embodiment, determining the corresponding update value of each element contained in the row vector, based on the normalization results of the row vector and the preset adjustment parameter λ, includes: determining, for an element in elements contained in the row vector, a square root of a product of the normalization result corresponding to the element and λ as the update value corresponding to the element.

In some optional implementations of the present embodiment, the first matrix is obtained through steps as follows: splitting the sketch into at least two sub-images; performing feature extraction respectively on the at least two sub-images using a pre-trained convolutional neural network, to obtain feature vectors corresponding to the at least two sub-images respectively; and determining a matrix composed of the feature vectors corresponding to the at least two sub-images respectively as the first matrix.

In some optional implementations of the present embodiment, the convolutional neural network is obtained by training through steps as follows: acquiring a sketch set, and acquiring matching image sets corresponding to each sketch in the sketch set, wherein a sketch and a matching image in a corresponding matching image set are used to present the same item; selecting a sketch from the sketch set, and performing training steps as follows: performing feature extractions on the selected sketch and images in a target image set respectively to obtain output matrices respectively corresponding to the sketch and the images in the target image set using an initial model; determining a matching degree between the obtained output matrix corresponding to the sketch and the output matrix corresponding to each image in the target image set, respectively, and selecting an image having a corresponding matching degree greater than a preset threshold; and determining a recall ratio and/or precision ratio corresponding to the selected image based on the selected image and a matching image set corresponding to an input sketch, and determining whether training of the initial model is completed based on the determined recall ratio and/or precision ratio; determining, in response to determining that the training of the initial model is completed, the trained initial model as the convolutional neural network; and adjusting, in response to determining that the training of the initial model is not completed, a parameter of the initial model based on the determined recall ratio and/or precision ratio, and determining an adjusted initial model as the initial model, reselecting a sketch from the sketch set, and continuing performing the training steps.

In the apparatus provided by the embodiments of the present disclosure, the acquisition unit acquires a first matrix obtained by performing feature extraction on a sketch of a target item, acquires a second matrix composed of word vectors of keywords in a keyword set corresponding to the target item, the keywords in the keyword set being used to describe the target item; acquires a third matrix set obtained by performing feature extractions on images in an image set respectively; the determination unit determines, for a third matrix in the third matrix set, a matching degree between an item presented in an image corresponding to the third matrix and the target item, based on a matching degree between the first matrix and the third matrix, and a matching degree between the second matrix and the third matrix; and the sending unit selects a preset number of images from the image set based on the determined matching degrees, and sends the selected images. Therefore, the failing to perform retrieval or a low accuracy of retrieval results when the user cannot provide an original image of the item may be avoided. At the same time, by combining features such as the size and structure of the item provided by the sketch, as well as semantic features of the item provided by the keywords, the accuracy of the retrieval result is ensured.

Figure 6:
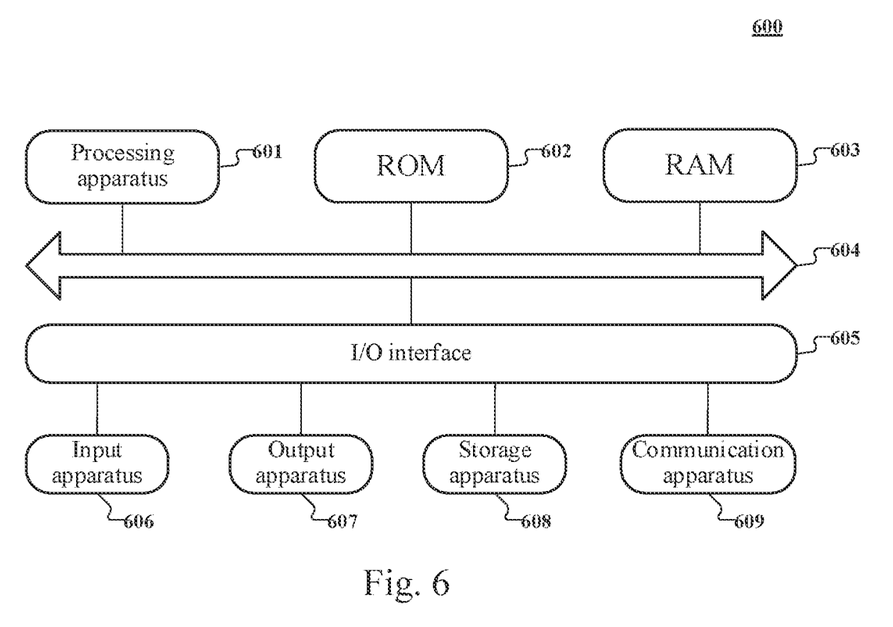
FIG. 6 is a schematic structural diagram of an electronic device adapted to implement embodiments of the present disclosure.

With further reference to FIG. 6, illustrating a schematic structural diagram of an electronic device (for example, the server in FIG. 1) 600 adapted to implement embodiments of the present disclosure. The terminal devices in the embodiments of the present disclosure may include, but are not limited to, mobile terminals such as mobile phones, laptop computers, digital broadcast receivers, PDAs (personal digital assistants), PADs (tablets), PMPs (portable multimedia players), vehicle-mounted terminals (for example, vehicle-mounted navigation terminals) and fixed terminals such as digital TVs and desktop computers. The server shown in FIG. 6 is only an example, and should not bring any limitation to the function and scope of use of the embodiments of the present disclosure.

As shown in FIG. 6, the electronic device 600 may include a processing apparatus 601 (such as a central processing unit and a graphic processor), which may execute various appropriate actions and processes in accordance with a program stored in a read-only memory (ROM) 602 or a program loaded into a random access memory (RAM) 603 from a storage apparatus 608. The RAM 603 also stores various programs and data required by operations of the electronic device 600. The processing apparatus 601, the ROM 602 and the RAM 603 are connected to each other through a bus 604. An input/output (I/O) interface 605 is also connected to the bus 604.

Generally, the following apparatuses are connected to the I/O interface 605: an input apparatus 606 including a touch screen, a touchpad, a keyboard, a mouse and the like; an output apparatus 607 including a liquid crystal display (LCD), a speaker, a vibrator and the like; a storage apparatus 608 including a magnetic tap, a hard disk and the like; and a communication apparatus 609. The communication apparatus 609 may allow the electronic device 600 to perform wireless or wired communication with other devices to exchange data. Although FIG. 6 shows the electronic device 600 having various apparatuses, it should be appreciated that it is not required to implement or provide all the shown apparatuses, and it may alternatively be implemented or provided with more or fewer apparatuses. Each block shown in FIG. 6 may represent one apparatus or multiple apparatuses according to requirements.

In particular, according to some embodiments of the present disclosure, the process described above with reference to the flowchart may be implemented as a computer software program. For example, some embodiments of the present disclosure include a computer program product, which includes a computer program carried on a computer readable medium. The computer program includes program codes for executing the method shown in the flowchart. In such an embodiment, the computer program may be downloaded and installed from a network via the communication apparatus 609, or may be installed from the storage apparatus 608, or may be installed from the ROM 602. The computer program, when executed by the processing apparatus 601, implements the above functionalities as defined by the method of some embodiments of the present disclosure.

It should be noted that the computer readable medium described by some embodiments of the present disclosure may be computer readable signal medium or computer readable storage medium or any combination of the above two. The computer readable storage medium may be, but is not limited to: an electric, magnetic, optical, electromagnetic, infrared, or semiconductor system, an apparatus, an element, or any combination of the above. A more specific example of the computer readable storage medium may include but is not limited to: an electrical connection with one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical medium containing or storing programs which can be used by or in combination with an instruction execution system, an apparatus or an element. In some embodiments of the present disclosure, the computer readable signal medium may include a data signal in the base band or propagating as a part of a carrier, in which computer readable program codes are carried. The propagating signal may be various forms, including but not limited to: an electromagnetic signal, an optical signal or any suitable combination of the above. The computer readable signal medium may be any computer readable medium except for the computer readable storage medium. The computer readable signal medium is capable of transmitting, propagating or transferring programs for use by or in combination with an instruction execution system, an apparatus or an element. The program codes contained on the computer readable medium may be transmitted with any suitable medium including but not limited to: a wire, an optical cable, RF (Radio Frequency), or any suitable combination of the above.

The above computer readable medium may be included in the electronic device; or may alternatively be present alone and not assembled into the electronic device. The computer readable medium carries one or more programs that, when executed by the electronic device, cause the electronic device to: acquire a first matrix obtained by performing feature extraction on a sketch of a target item; acquire a second matrix composed of word vectors of keywords in a keyword set corresponding to the target item, the keywords in the keyword set being used to describe the target item; acquire a third matrix set obtained by performing feature extractions on images in an image set respectively; determine, for a third matrix in the third matrix set, a matching degree between an item presented in an image corresponding to the third matrix and the target item, based on a matching degree between the first matrix and the third matrix, and a matching degree between the second matrix and the third matrix; and select a preset number of images from the image set based on the determined matching degrees, and send the selected images.

A computer program code for executing operations of some embodiments of the present disclosure may be written in one or more programming languages or a combination thereof. The programming languages include object-oriented programming languages, such as Java, Smalltalk or C++, and also include conventional procedural programming languages, such as "C" language or similar programming languages. The program code may be completely executed on a user computer, partially executed on a user computer, executed as a separate software package, partially executed on a user computer and partially executed on a remote computer, or completely executed on a remote computer or server. In a case involving a remote computer, the remote computer may be connected to a user computer through any kind of network, including a local area network (LAN) or a wide area network (WAN), or may be connected to an external computer (for example, connected through Internet using an Internet service provider).

The flowcharts and block diagrams in the accompanying drawings show architectures, functions and operations that may be implemented according to the systems, methods and computer program products of the various embodiments of the present disclosure. In this regard, each of the blocks in the flowcharts or block diagrams may represent a module, a program segment, or a code portion, the module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flowcharts as well as a combination of blocks in the block diagrams and/or flowcharts may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, may be described as: a processor, including an acquisition unit, a determination unit and a sending unit, where the names of these units do not constitute a limitation to such units themselves in some cases. For example, the sending unit may alternatively be described as "a unit of selecting a preset number of images from the image set based on the determined matching degree, and sending the selected images".

The above description only provides an explanation of the preferred embodiments of the present disclosure and the technical principles used. It should be appreciated by those skilled in the art that the inventive scope involved in the present disclosure is not limited to the technical solutions formed by the particular combinations of the above technical features. The inventive scope should also cover other technical solutions formed by any combinations of the above technical features or equivalent features thereof without departing from the concept of the present disclosure, such as technical solutions formed through the above features and technical features having similar functions provided (or not provided) in the present disclosure being replaced with each other.

What is claimed is:

1. A method for retrieving an image, the method comprising:
    acquiring a sketch of a target item as a retrieving input, and performing feature extraction on the sketch to obtain a first matrix;
    acquiring a second matrix composed of word vectors of keywords in a keyword set corresponding to the target item, wherein the keywords in the keyword set are used to describe the target item;
    acquiring a third matrix set obtained by performing feature extractions on images in an image set respectively;
    determining, for a third matrix in the third matrix set, a comprehensive matching degree between an item presented in an image corresponding to the third matrix and the target item, based on a first matching degree between the first matrix and the third matrix and a second matching degree between the second matrix and the third matrix; and selecting a preset number of images from the image set based on the determined comprehensive matching degrees as retrieval outputs, and sending the retrieval outputs;

wherein the first matching degree between the first matrix and the third matrix, and the second matching degree between the second matrix and the third matrix are determined through steps as follows: using the first matrix, the second matrix, and the third matrix as a target matrix respectively to perform encoding processing on each target matrix, so as to obtain a first encoding matrix, a second encoding matrix, and a third encoding matrix, wherein the encoding processing is used to map the target matrix into a binary encoding matrix; and determining a matching degree between the first encoding matrix and the third encoding matrix as the first matching degree between the first matrix and the third matrix, and determining a matching degree between the second encoding matrix and the third encoding matrix as the second matching degree between the second matrix and the third matrix;

wherein the encoding processing comprises: for a row vector S in row vectors of the target matrix, performing following steps: splitting elements comprised in S into C groups, wherein C represents the number of columns of the encoding matrix; determining, for a group in the C groups, a statistical feature of values of elements comprised in the group; determining, in response to determining that the determined statistical feature is greater than a target threshold T, that an encoding value of the group is 1; and determining, in response to determining that the determined statistical feature is less than T, that the encoding value of the group is 0; and forming a row of the encoding matrix by the encoding values corresponding to the groups in the C groups respectively, to obtain the encoding matrix; and wherein $$T = \lceil D/C \rceil \times \sum_{i=1}^{i=D} S_i,$$

wherein D represents the number of elements comprised in S, and $S_i$ represents a value of the $i^{th}$ element in S.

2. The method according to claim 1, wherein determining the comprehensive matching degree between the item presented in the image corresponding to the third matrix and the target item, based on the first matching degree between the first matrix and the third matrix and the second matching degree between the second matrix and the third matrix, comprises:

acquiring a first preset weight of the first matrix, and acquiring a second preset weight of the second matrix; and determining, based on the acquired first preset weight and the second preset weight, the comprehensive matching degree between the item presented in the image corresponding to the third matrix and the target item according to a weighted sum of the first matching degree between the first matrix and the third matrix and the second matching degree between the second matrix and the third matrix.

3. The method according to claim 1, wherein splitting elements comprised in S into C groups, comprises:

determining a quotient of the number of elements comprised in S and C, and determining the number of elements comprised in each group of the C groups based on the determined quotient.

4. The method according to claim 1, wherein the encoding processing comprises:

performing following update processing respectively for each row vector of the target matrix, to obtain an updated target matrix: normalizing the row vector, and determining a corresponding update value of each element contained in the row vector based on normalization results of the row vector, wherein the corresponding update value of each element contained in the row vector is positively correlated with the normalization result corresponding to the element; and performing following steps for a row vector S in row vectors of the updated target matrix:

splitting elements comprised in S into C groups, wherein C represents the number of columns of the encoding matrix;

determining, for a group in the C groups, a statistical feature of values of elements comprised in the group; determining, in response to determining that the determined statistical feature is greater than a target threshold T, that an encoding value of the group is 1; and determining, in response to determining that the determined statistical feature is less than T, that the encoding value of the group is 0; and forming a row of the encoding matrix by the encoding values corresponding to the groups in the C groups respectively, to obtain the encoding matrix.

5. The method according to claim 4, wherein determining the corresponding update value of each element contained in the row vector based on normalization results of the row vector, comprises:

determining the corresponding update value of each element contained in the row vector, based on the normalization results of the row vector and a preset adjustment parameter λ, wherein the corresponding update value of each element contained in the row vector is positively correlated with λ.

6. The method according to claim 5, wherein determining the corresponding update value of each element contained in the row vector, based on the normalization results of the row vector and the preset adjustment parameter λ, comprises:

determining, for an element in elements contained in the row vector, a square root of a product of the normalization result corresponding to the element and λ as the update value corresponding to the element.

7. The method according to claim 1, wherein the first matrix is obtained through steps as follows:

splitting the sketch into at least two sub-images;

performing feature extraction respectively on the at least two sub-images using a pre-trained convolutional neural network, to obtain feature vectors corresponding to the at least two sub-images respectively; and determining a matrix composed of the feature vectors corresponding to the at least two sub-images respectively as the first matrix.

8. The method according to claim 7, wherein the convolutional neural network is obtained by training through steps as follows:

acquiring a sketch set, and acquiring matching image sets corresponding to each sketch in the sketch set, wherein a sketch and a matching image in a corresponding matching image set are used to present the same item;

selecting a sketch from the sketch set, and performing training steps as follows: performing feature extractions on the selected sketch and images in a target image set respectively to obtain output matrices respectively corresponding to the sketch and the images in the target image set using an initial model; determining a matching degree between the obtained output matrix corresponding to the sketch and the output matrix corresponding to each image in the target image set, respectively, and selecting an image having a corresponding matching degree greater than a preset threshold; and determining a recall ratio or precision ratio corresponding to the selected image based on the selected image and a matching image set corresponding to an input sketch, and determining whether training of the initial model is completed based on at least one of the determined recall ratio or precision ratio;

determining, in response to determining that the training of the initial model is completed, the trained initial model as the convolutional neural network; and adjusting, in response to determining that the training of the initial model is not completed, a parameter of the initial model based on the determined recall ratio or precision ratio, and determining an adjusted initial model as the initial model, reselecting a sketch from the sketch set, and continuing performing the training steps.

9. An apparatus for retrieving an image, the apparatus comprising:

at least one processor; and a memory storing instructions, wherein the instructions when executed by the at least one processor, cause the at least one processor to perform operations, the operations comprising:

acquiring a sketch of a target item as a retrieving input, and performing feature extraction on the sketch to obtain a first matrix;

acquiring a second matrix composed of word vectors of keywords in a keyword set corresponding to the target item, wherein the keywords in the keyword set are used to describe the target item;

acquiring a third matrix set obtained by performing feature extractions on images in an image set respectively;

determining, for a third matrix in the third matrix set, a comprehensive matching degree between an item presented in an image corresponding to the third matrix and the target item, based on a first matching degree between the first matrix and the third matrix, and a second matching degree between the second matrix and the third matrix; and selecting a preset number of images from the image set based on the determined comprehensive matching degrees as retrieval outputs, and sending the retrieval outputs;

wherein the first matching degree between the first matrix and the third matrix, and the second matching degree between the second matrix and the third matrix are determined through steps as follows: using the first matrix, the second matrix, and the third matrix as a target matrix respectively to perform encoding processing on each target matrix, so as to obtain a first encoding matrix, a second encoding matrix, and a third encoding matrix, wherein the encoding processing is used to map the target matrix into a binary encoding matrix; and determining a matching degree between the first encoding matrix and the third encoding matrix as the first matching degree between the first matrix and the third matrix, and determining a matching degree between the second encoding matrix and the third encoding matrix as the second matching degree between the second matrix and the third matrix;

wherein the encoding processing comprises: for a row vector S in row vectors of the target matrix, performing following steps: splitting elements comprised in S into C groups, wherein C represents the number of columns of the encoding matrix; determining, for a group in the C groups, a statistical feature of values of elements comprised in the group; determining, in response to determining that the determined statistical feature is greater than a target threshold T, that an encoding value of the group is 1; and determining, in response to determining that the determined statistical feature is less than T, that the encoding value of the group is 0; and forming a row of the encoding matrix by the encoding values corresponding to the groups in the C groups respectively, to obtain the encoding matrix; and wherein $$T = \lceil D/C \rceil \times \sum_{i=1}^{i=D} S_i$$

wherein D represents the number of elements comprised in S, and $S_i$ represents a value of the $i^{th}$ element in S.

10. A non-transitory computer-readable medium storing a computer program thereon, wherein the program, when executed by a processor, causes the processor to perform operations comprising:

acquiring a sketch of a target item as a retrieving input, and performing feature extraction on the sketch to obtain a first matrix;

acquiring a second matrix composed of word vectors of keywords in a keyword set corresponding to the target item, wherein the keywords in the keyword set are used to describe the target item;

acquiring a third matrix set obtained by performing feature extractions on images in an image set respectively;

determining, for a third matrix in the third matrix set, a comprehensive matching degree between an item presented in an image corresponding to the third matrix and the target item, based on a first matching degree between the first matrix and the third matrix and a second matching degree between the second matrix and the third matrix; and selecting a preset number of images from the image set based on the determined comprehensive matching degrees as retrieval outputs, and sending the retrieval outputs;

wherein the first matching degree between the first matrix and the third matrix, and the second matching degree between the second matrix and the third matrix are determined through steps as follows: using the first matrix, the second matrix, and the third matrix as a target matrix respectively to perform encoding processing on each target matrix, so as to obtain a first encoding matrix, a second encoding matrix, and a third encoding matrix, wherein the encoding processing is used to map the target matrix into a binary encoding matrix; and determining a matching degree between the first encoding matrix and the third encoding matrix as the first matching degree between the first matrix and the third matrix, and determining a matching degree between the second encoding matrix and the third encoding matrix as the second matching degree between the second matrix and the third matrix;
wherein the encoding processing comprises: for a row vector S in row vectors of the target matrix, performing following steps: splitting elements comprised in S into C groups, wherein C represents the number of columns of the encoding matrix; determining, for a group in the C groups, a statistical feature of values of elements comprised in the group; determining, in response to determining that the determined statistical feature is greater than a target threshold T, that an encoding value of the group is 1; and determining, in response to determining that the determined statistical feature is less than T, that the encoding value of the group is 0; and forming a row of the encoding matrix by the encoding values corresponding to the groups in the C groups respectively, to obtain the encoding matrix; and wherein $$T = \lceil D/C \rceil \times \sum_{i=1}^{i=D} S_i$$

wherein D represents the number of elements comprised in S, and $S_i$ represents a value of the $i^{th}$ element in S.

* * * * *